United States Patent
Mouhebaty et al.

(10) Patent No.: US 6,880,405 B2
(45) Date of Patent: Apr. 19, 2005

(54) ELECTRICAL/VISUAL DIFFERENTIAL PRESSURE INDICATOR WITH SOLID STATE SENSOR

(75) Inventors: Bijan Mouhebaty, Westlake Village, CA (US); Fermin Alejandro Sandoval Diaz, Camarillo, CA (US); Daniel K. Moscaritolo, Thousand Oaks, CA (US)

(73) Assignee: PTI Technologies, Inc., Oxnard, CA (US)

( * ) Notice: Subject to any disclaimer, the term of this patent is extended or adjusted under 35 U.S.C. 154(b) by 67 days.

(21) Appl. No.: 10/334,085

(22) Filed: Dec. 30, 2002

(65) Prior Publication Data

US 2004/0123668 A1 Jul. 1, 2004

(51) Int. Cl.[7] .................................................. G01L 9/00
(52) U.S. Cl. ............................. 73/723; 73/717; 73/715; 73/753
(58) Field of Search ................................... 73/700–756

(56) References Cited

U.S. PATENT DOCUMENTS

| | | | |
|---|---|---|---|
| 5,285,648 A | 2/1994 | Bessler | 62/129 |
| 5,304,757 A | 4/1994 | Hensel | 200/82 |
| 5,693,926 A * | 12/1997 | Cassidy | 200/82 E |
| 5,836,876 A * | 11/1998 | Dimarogonas | 600/407 |
| 6,034,596 A * | 3/2000 | Smith et al. | 340/447 |

FOREIGN PATENT DOCUMENTS

| | | | | |
|---|---|---|---|---|
| EP | 0 042 276 A1 | 12/1981 | | |
| EP | 0 083 000 A2 | 7/1983 | | |
| GB | 1 254 815 | 11/1971 | | |
| JP | 402078926 A * | 3/1990 | | G01L/9/14 |

* cited by examiner

Primary Examiner—Edward Lefkowitz
Assistant Examiner—Jermaine Jenkins
(74) Attorney, Agent, or Firm—Pillsbury Winthrop LLP

(57) ABSTRACT

A differential pressure indicator has a housing with at least two ports in the housing. One port receives a first pressure, and the second port receives a second pressure. A pressure resistive device is placed between the first port and the second port. The pressure resistive device changes its position when the first pressure exceeds the second pressure by a predetermined amount. A magnet is coupled to the pressure resistive device. A digital displacement sensor senses the position of the magnet. The digital displacement sensor is in communication with an electronic indicator. The electronic indicator activates when the first pressure exceeds the second pressure by a predetermined amount.

32 Claims, 5 Drawing Sheets

ELECTRICAL/VISUAL DIFFERENTIAL PRESSURE INDICATOR WITH SOLID STATE SENSOR

FIELD OF INVENTION

The present invention is directed generally to a differential pressure indicator, and more specifically, to a differential pressure indicator incorporating the use of a digital displacement sensor.

BACKGROUND

Many attempts have been made in the past to provide a mechanism for monitoring the condition of a filter in either a fluid or gaseous environment and to detect whether a filter element must be replaced or reconditioned before continuing operation. These devices are, for example, used in hydraulic systems to provide a visual or electrical signal (or a combination of both) when differential pressures across a filter element exceed a set value. Devices of this nature have been fashioned in electrical forms, mechanical forms, or a combination of both. However, problems have arisen with the said devices.

The most cost-efficient indicators to date utilize a combination of mechanical and electrical elements. In these hybrid indicators, a mechanical micro switch is used to provide a signal by opening or closing an electrical circuit. However, the use and reliability of a micro switch is limited when low currents (less than 0.5 amp) are required. Additionally, many applications require hermetically sealed switches, which in turn increase the size, weight, and cost of the indicator.

Thus, there is a need for reliable, small, inexpensive differential pressure indicators that can work with low currents and a broad range of temperatures, especially for applications involving hydraulic systems in aircraft.

DETAILED DESCRIPTION

Embodiments of the present invention are directed to differential pressure indicators incorporating pressure-resistive devices and digital displacement sensors to measure filter performance characteristics. Various pressure-resistive devices may be used depending on the relevant pressures involved in the application. Similarly, various electrical indicators may be used depending on the relevant application of the differential pressure indicator. Embodiments of the present invention may be used in either gas pressure or fluid pressure applications.

The differential pressure indicator presented herein replaces the mechanical micro switch of previous designs with a solid state digital displacement sensor. The use of a non-mechanical electrical switch and electronic indicator significantly reduces the part count compared with existing differential pressure indicator designs. The reduction in part count also has an immediate impact on assembly component cost and has the added benefit of improving reliability in both low and high differential pressure applications regardless of the system pressure. Differential pressure indicators are less susceptible to shock and vibration, smaller in size and more suitable to low current applications. Furthermore, digital displacement sensors provide a significant cost savings over micro switches.

The reduction of moving parts along with the robustness of solid state electronics enhances the reliability and capability of the indicator. Additionally, with this approach, the operating and release points can be maintained within a few pounds per square inch differential ("PSID"), even over a wide range of voltage inputs. According to the preferred embodiment of the invention, the differential pressure indicator can work with voltages ranging from 3.8 to 30 VDC and can operate with a current supply as low as 10 mA. Additionally, this indicator can work within operating temperatures ranging from −40° F. to +302° F.

Figure 1:
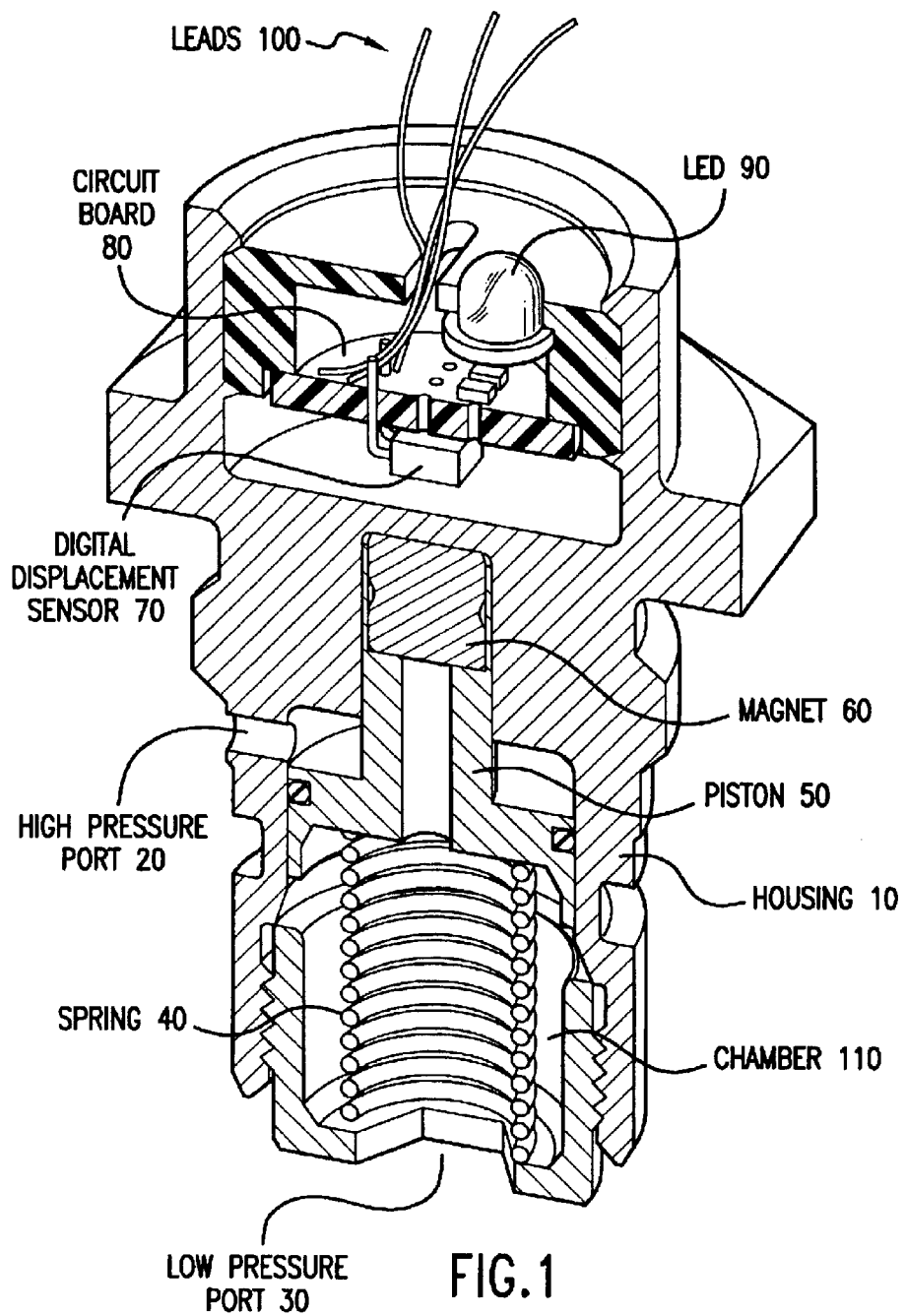
FIG. 1 depicts a cut-away view of a differential pressure indicator in a non-actuated state according to an embodiment of the present invention.

FIG. 1 depicts a cut-away view of a differential pressure indicator in a non-actuated state according to a preferred embodiment of the present invention. The differential pressure indicator, according to this embodiment, includes a housing 10, a high pressure port 20, a low pressure port 30, a spring 40, a chamber 110 housing a piston 50, a magnet 60, a digital displacement sensor 70, a control module 80, a light-emitting diode ("LED") 90, and leads 100. According to the embodiment of FIG. 1, a pressure upstream from a filter element is ported to the high pressure port 20 that is ported through the housing 10, and the upstream pressure pushes on one end of the piston 50, which resides in a chamber 110 in the housing 10. A pressure downstream from a filter is ported to the low pressure port 30, also ported through the housing 10, and the downstream pressure pushes on the opposite end of the piston 50. The piston 50 is coupled to the spring 40 at one end, and the permanent magnet 60 at the other. The magnet 60 provides a magnetic field that affects the digital displacement sensor 70. The digital displacement sensor 70 is coupled to the control module 80, and the magnetic field of the magnet 60 causes the digital displacement sensor 70 to output a different digital signal to the control module 80 than it would otherwise if the magnetic field were not present. The control module 80 is electronically coupled to the LED 90, and the leads 100. The leads 100 allow for remote sensing, such as coupling the leads to an LED located some distance from the differential pressure indicator, for instance, in an instrument panel in the cockpit of an airplane.

When the differential pressure indicator is in a non-actuated state as shown in FIG. 1, the magnet 60 is in the presence of the digital displacement sensor 70, and the magnetic field produced by the magnet 60 causes the digital displacement sensor 70 to produce a certain digital signal to the control module 80.

Figure 2:
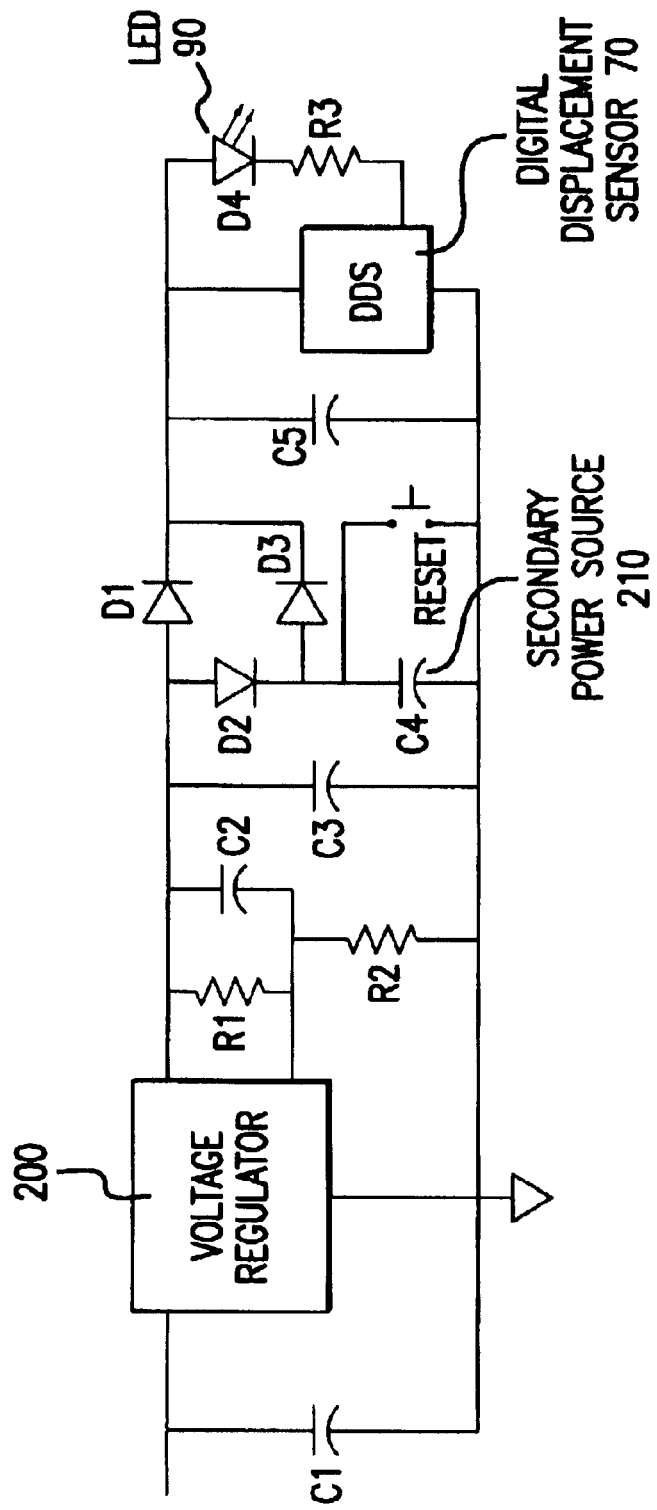
FIG. 2 depicts an electrical schematic of a control module incorporating a circuit board according to an embodiment of the present invention.

FIG. 2 depicts a control module according to an embodiment of the present invention wherein the control module is an electronic circuit. In FIG. 2, a voltage regulator 200 is in electrical communication with the digital displacement sensor 70. The voltage regulator 200 receives power from an external supply, for instance, from an airplane's battery or alternator. The incorporation of the voltage regulator increases the life of the electrical components and allows the differential pressure indicator to work across a broad range of voltage inputs. The voltage regulator changes the voltage input it receives to a voltage output that can be specifically used by the circuit. For example, the voltage regulator 200 accepts 30 VDC from the power source and drops the voltage to 5 VDC. The regulator 200 operates to maintain the output supply voltage at 5V, for example, even if the load which it is supplied changes.

In FIG. 2, when the differential pressure indicator is in a non-actuated state, the digital displacement sensor 70 is in the magnetic field of the magnet 60 and is producing a digital signal of "1" (voltage=5 VDC), so that no voltage potential exists across the LED 90. When the digital displacement sensor is not within the magnetic field of the magnet 60, the digital displacement sensor 70 produces a digital signal of "0" (voltage≠1V), this allows the voltage from the regulator to be applied across the LED 90, energizing the LED 90. In a preferred embodiment, if the primary power source is removed, as when the aircraft is turned off when parked, for example, the electronic indicator remains activated by an embedded power source. The embedded power source is a secondary power source to a primary power source that powers the circuit. In FIG. 2, the embedded power source is depicted as a capacitor 210, according to one embodiment of the present invention. According to another embodiment, the embedded power source may be a battery.

In an embodiment of the invention using an electronic circuit as a control module, C1 is a 1 μF 100V capacitor, C2 is a 1500 nF 50V capacitor, C3 and C5 are 2.2 μF 10V capacitors, C4 is a 1.0 Farad Gold CAP capacitor, D1–D3 are Schottky 30 V 30 mA diodes, D4 is a 3 MM LED, R1 is a 43.2 KΩ resistor, R2 is a 12.1 KΩ resistor, R3 is a 2 KΩ resistor, and the DDS is the digital displacement sensor PTI P/N 7594207-101. The present invention is not limited to the illustrated embodiment, and one skilled in the art may easily modify this circuit and/or its values to accomplish the same goals with different configurations. Furthermore, while this schematic depicts an embodiment where the digital displacement sensor 70 produces a digital value of "1" in the presence of a magnetic field and "0" otherwise, one skilled in the art could easily manipulate this schematic such that the digital displacement sensor 70 produces a digital value of "0" in the presence of a magnetic field and "1" otherwise.

Figure 5:
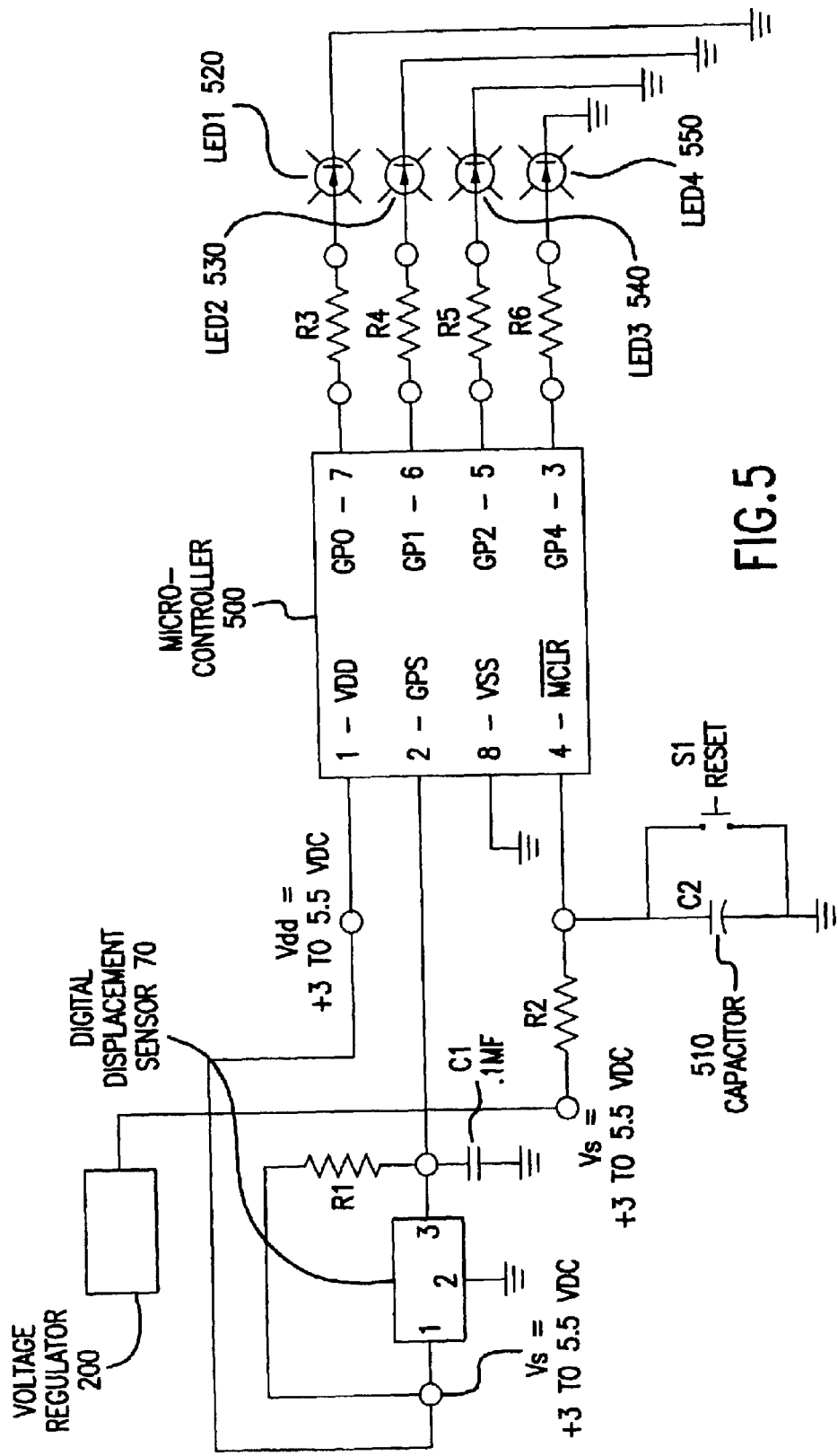
FIG. 5 depicts an electrical schematic of a control module incorporating a microcontroller according to an embodiment of the present invention.

FIG. 5 depicts a control module according to a preferred embodiment of the present invention wherein the control module is a microcontroller. In FIG. 5, a voltage regulator 200 is in electrical communication with a microcontroller 500, a digital displacement sensor 70, and the secondary power source, in this case, a capacitor 510. In FIG. 5, when the differential pressure indicator is in a non-actuated state, the digital displacement sensor 70 is in the magnetic field of the magnet 60 and is outputting a digital signal of "1" (voltage=5 VDC), to the microcontroller 500. When the digital displacement sensor is not within the magnetic field of the magnet 60, the digital displacement sensor 70 outputs a digital signal of "0" (voltage≠1V) to the microcontroller 500. The microcontroller 500 determines the amount of time that the digital displacement sensor 70 has been outputting a digital signal of "0." If the digital displacement sensor 70 outputs a digital signal of "0" for less than two (2) seconds, then LED1 520 is activated. If the digital displacement sensor 70 outputs a digital signal of "0" for more than two (2) seconds, but less than five (5) seconds, then LED2 530 is activated. If the digital displacement sensor 70 outputs a digital signal of "0" for more than five (5) seconds, but less than ten (10) seconds, LED3 540 is activated. And if the digital displacement sensor 70 outputs a digital signal of "0" for more than ten (10) seconds, LED4 550 is activated.

The addition of multiple LED's that sequentially activate based upon a signal's temporal measurement alert to the possibility of "false positives" caused by pressure spikes. That is, occasionally a system experiences a pressure spike that is not caused by the fouling of a filter, but rather by some other anomaly. These pressure spikes characteristically only occur for a short period of time, for example a period of three or four seconds. The use of a microcontroller alerts to the presence of a pressure spike as opposed to the fouling of a filter and saves needless examination or replacement of the filter. However, if the differential pressure surpasses the actuation differential pressure for longer than ten (10) seconds (thus causing the digital displacement sensor 70 to output a digital signal of "0" for longer than ten (10) seconds), the cause is most likely due to a fouled filter and not a pressure spike. Thus, if LED4 520 activates, it alerts that the filter is most likely fouled and needs examination or replacement.

In a preferred embodiment of the differential pressure indicator incorporating the use of a microcontroller, if the primary power source is removed, as when the aircraft is turned off when parked, for example, the electronic indicator remains activated by an embedded power source. In FIG. 5, the embedded power source is depicted as a capacitor 510, according to one embodiment of the present invention. According to another embodiment, the embedded power source may be a battery.

In an embodiment of the present invention incorporating the use of a microcontroller as a control module, the microcontroller is Microchip PIC12C Family Part Number PIC12C509A, the digital displacement sensor is Honeywell Digital Position Sensor Model No. SS449A, C1 is a Resin Dipped Solid Tantalum, 35 VDC 0.1 mF capacitor, C2 is a Ceramic Disc, 25 V 0.1 mF capacitor, R1 is a Metal Film, 0.25 W 100 KΩ resistor, R2 is a Metal Film, 0.25 W 33KΩ resistor, R3–R6 are Metal Film, 0.25W 1 KΩ resistors, and LED1–LED4 are Amber 1.5 VDC 20 mA Light Emitting Diodes. The present invention is not limited to the illustrated embodiment, and one skilled in the art may easily modify this circuit and/or its values to accomplish the same goals with different configurations. Furthermore, while this schematic depicts an embodiment where the digital displacement sensor 70 produces a digital value of "1" in the presence of a magnetic field and "0" otherwise, one skilled in the art could easily manipulate this schematic such that the digital displacement sensor 70 produces a digital value of "0" in the presence of a magnetic field and "1" otherwise.

Figure 3:
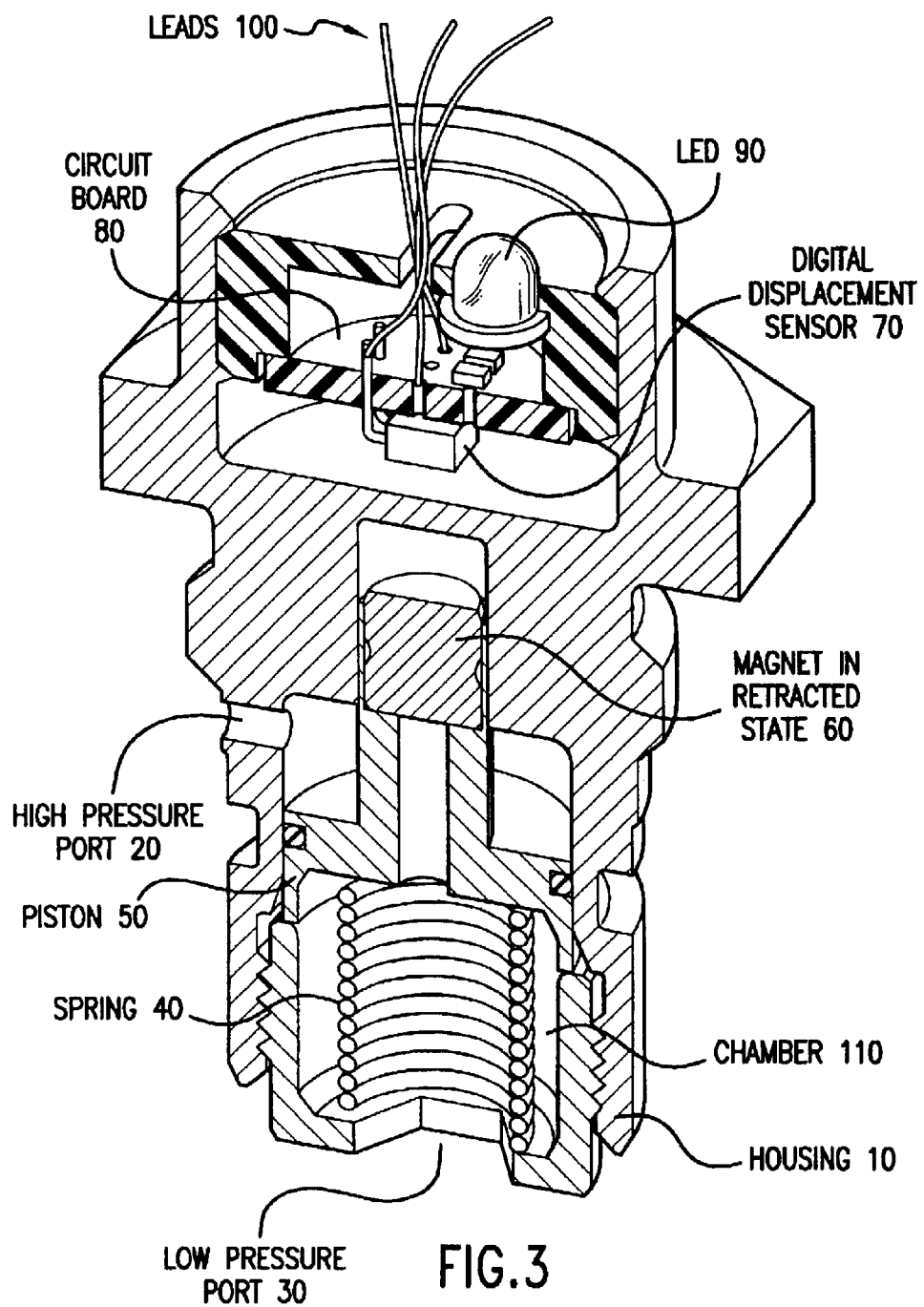
FIG. 3 depicts a cut-away view of a differential pressure indicator in an actuated state according to an embodiment of the present invention.

FIG. 3 depicts a differential pressure indicator in an actuated state according to a preferred embodiment of the present invention. In the actuated state, the pressure flowing upstream of a filter, flowing through the high pressure port 20, is higher than the pressure flowing downstream and ported through the low pressure port 30. This difference in pressure tends to push the piston 50 towards the low pressure port 30. If the upstream pressure being ported through the high pressure port 20 exceeds the downstream pressure being ported through the low pressure port 30 by a specified value (the actuation differential pressure), then the piston/magnet combination will move far enough away from the digital displacement sensor 70 such that the magnetic field no longer engages the digital displacement sensor 70. When the digital displacement sensor 70 is no longer engaged by the magnetic field, it causes the power flowing through the circuit 80 to pass through the LED 90, activating it.

The specific actuation differential pressure, that is, the difference in pressure between the upstream pressure and the downstream pressure that causes the LED 90, or other suitable electronic indicator, to activate may be set by varying the strength and tension of the spring 40.

Figure 4:
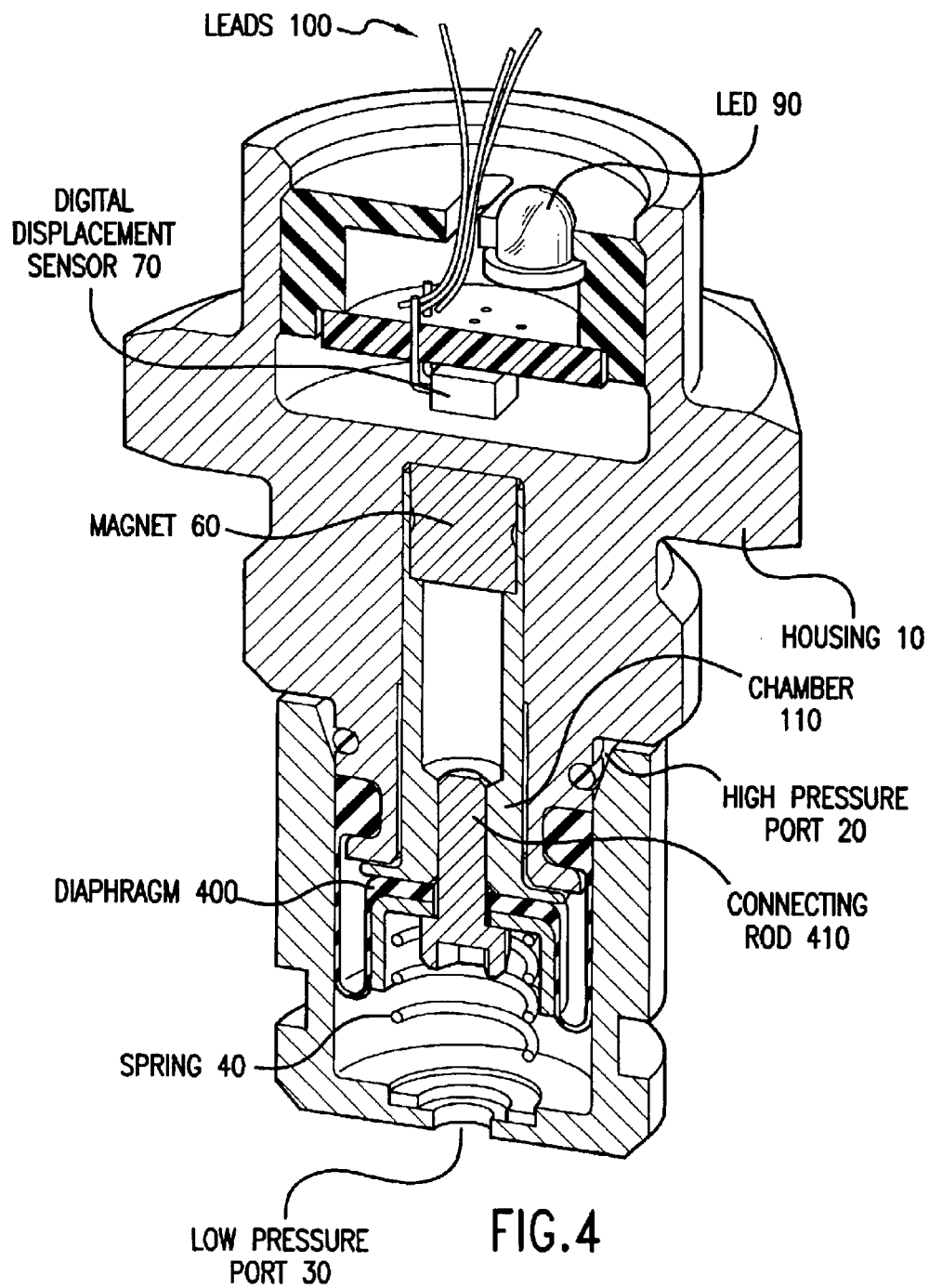
FIG. 4 depicts a cut-away view of a differential pressure indicator in a non-actuated position according to an alternative embodiment of the present invention.

FIG. 4 shows a cut-away view of a differential pressure indicator with a diaphragm assembly as its pressure resistive device. For applications involving low differential pressures, i.e., differential pressures below 15 PSID, a preferred embodiment utilizes a diaphragm assembly. FIG. 4 is similar to FIG. 1 except that the piston assembly has been replaced with a diaphragm assembly. In this embodiment of the invention, upstream pressure is ported through the high pressure port 20 such that the upstream pressure presses against one side of the diaphragm 400. Downstream pressure is ported through the low pressure port 30 and pushes against the opposite side of the diaphragm 400. A connecting rod 410 passes through the diaphragm 400 and is coupled to the spring 40 at one end and a magnet 60 at the other. When the upstream pressure exceeds the downstream pressure, the differential pressure pushes the diaphragm 400 towards the low pressure port 30. The movement of the diaphragm 400 causes the connecting rod 410 to move towards the low pressure port 30 as well, withdrawing the magnet 60 from the presence of the digital displacement sensor 70. When the differential pressure exceeds the actuation differential pressure, the magnet 60 will have moved far enough away from the presence of the digital displacement sensor 70 so that the magnetic field of the magnet 60 no longer engages the digital displacement sensor 70. When the digital displacement sensor 70 is no longer engaged by the magnetic field, the digital placement senor 70 causes power to pass through the LED 90, activating it.

Another embodiment of the present invention utilizes any suitable pressure resistive device or module in the place of the piston assembly or diaphragm assembly.

In another embodiment of the present invention, any suitable type of electronic indicator may be utilized, replacing the light-emitting diode present in FIGS. 1, 2, and 3. The purpose of the electronic indicator is to provide a visual or auditory alert indicating that a filter may require cleaning, replacement, or examination.

In another embodiment of the present invention, no light emitting diode or other electronic indicator is present in the differential pressure indicator itself. Instead, a set of leads are used to electronically couple the differential pressure indicator to an electronic indicator located some distance away from the differential pressure indicator, for example, to a light-emitting diode located in the cockpit of the airplane. Another embodiment of the present invention may only have the electronic indicator, for instance an LED, electronically coupled to the circuit, leaving the leads off completely. In still another embodiment of the present invention, both the on-board light emitting diode, or other electronic indicator, and leads are present. This design has the added benefit of having an alert located some distance away from the actual differential pressure indicator, for example, in the cockpit of an airplane, and an alert at the actual site of the indicator so that when maintenance is required, the specific differential pressure indicator may be easily identified.

In one embodiment of the present invention, the housing 10 is made of metal. In another embodiment of the invention, the housing 10 is made of plastic or other suitable material.

In one embodiment of the present invention, the digital displacement sensor outputs a digital signal of 1 when the magnetic field of the magnet is present, and a digital signal of 0 when it is not. In another embodiment, the signals are reversed and when the magnetic field is present, the digital displacement sensor outputs a digital signal of 0 and when it the magnetic field is removed, it outputs a digital signal of 1.

While the description above refers to a particular embodiment of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the forgoing description, and all changes that come within the meaning and range of equivalency of the claims are therefore intended to be embraced therein.

What is claimed is:

1. A differential pressure indicator, comprising:
   a housing;
   at least two ports in the housing, a first port to which a first pressure is ported, and a second port to which a second pressure is ported;
   a pressure resistive device located between the first port and the second port, wherein the pressure resistive device changes a position when the first pressure exceeds the second pressure by a predetermined amount;
   a magnet coupled to the pressure resistive device;
   a solid state digital displacement sensor to sense a position of the magnet; and
   at least one electronic indicator in communication with the solid state digital displacement sensor, the at least one electronic indicator being activated when the first pressure exceeds the second pressure by a predetermined amount.

2. The differential pressure indicator according to claim 1, wherein the at least one electronic indicator is a light emitting diode (LED).

3. The differential pressure indicator according to claim 1, wherein the at least one electronic indicator is an auditory alert.

4. The differential pressure indicator according to claim 1, wherein the at least one electronic indicator is a light emitting diode (LED), and the light-emitting diode is located remotely from the housing of the differential pressure indicator.

5. The differential pressure indicator according to claim 1, wherein the pressure resistive device includes a piston assembly having:
   a piston; and
   a spring coupled to the piston at a first end of the piston, the magnet being coupled to a second end of the piston.

6. The differential pressure indicator according to claim 1, wherein the housing is made of metal.

7. The differential pressure indicator according to claim 1, wherein the housing is made of plastic.

8. The differential pressure indicator of claim 1, wherein the solid state digital displacement sensor does not require more than 0.49 amps to reliably operate.

9. The differential pressure indicator of claim 1, wherein the solid state digital displacement sensor reliably operates when the differential pressure indicator is supplied between about 10 milliamps and about 0.5 amps.

10. The differential pressure indicator of claim 1, wherein the solid state digital displacement sensor reliably operates when the differential pressure indicator is supplied about 10 milliamps.

11. A differential pressure indicator, comprising:
a housing;
at least two ports in the housing, a first port to which a first pressure is ported, and a second port to which a second pressure is ported;
a pressure resistive device located between the first port and the second port, wherein the pressure resistive device changes a position when the first pressure exceeds the second pressure by a predetermined amount and the pressure resistive device includes a diaphragm assembly having:
  a diaphragm; and
  a connecting rod, wherein a spring is coupled to a first end of the connecting rod and the magnet is coupled to a second end of the connecting rod, and the connecting rod is coupled to the diaphragm at a location between the first end and the second end of the connecting rod;
a magnet coupled to the pressure resistive device;
a digital displacement sensor to sense a position of the magnet; and
at least one electronic indicator in communication with the digital displacement sensor, the at least one electronic indicator being activated when the first pressure exceeds the second pressure by a predetermined amount.

12. A differential pressure indicator, comprising:
a housing;
at least two ports in the housing, a first port to which a first pressure is ported, and a second port to which a second pressure is ported;
a pressure resistive device located between the first port and the second port, wherein the pressure resistive device changes a position when the first pressure exceeds the second pressure by a predetermined amount;
a magnet coupled to the pressure resistive device;
a solid state digital displacement sensor to sense a position of the magnet; and
at least one electronic indicator in communication with the solid state digital displacement sensor, wherein the at least one electronic indicator being activated when the first pressure exceeds the second pressure by a predetermined amount, and the electronic indicator is in communication with a primary power source and a secondary power source, and the secondary power source is utilized only when the primary power source no longer provides power to the electronic indicator.

13. The differential pressure indicator according to claim 12, wherein the secondary power source is a high power capacitor.

14. The differential pressure indicator according to claim 12, wherein the secondary power source is a battery.

15. The differential pressure indicator according to claim 12, wherein the at least one electronic indicator is a light emitting diode (LED).

16. The differential pressure indicator according to claim 12, wherein the at least one electronic indicator is an auditory alert.

17. The differential pressure indicator according to claim 12, wherein the at least one electronic indicator is a light emitting diode (LED) and the light-emitting diode is located remotely from the housing of the differential pressure indicator.

18. The differential pressure indicator according to claim 12, wherein the pressure resistive device includes a piston assembly having:
a piston; and
a spring coupled to the piston at a first end of the piston, the magnet being coupled to a second end of the piston.

19. The differential pressure indicator according to claim 12, wherein the housing is made of metal.

20. The differential pressure indicator according to claim 12, wherein the housing is made of plastic.

21. A differential pressure indicator, comprising:
a housing;
at least two ports in the housing, a first port to which a first pressure is ported, and a second port to which a second pressure is ported;
a pressure resistive device located between the first port and the second port, wherein the pressure resistive device changes a position when the first pressure exceeds the second pressure by a predetermined amount, and the pressure resistive device includes a diaphragm assembly having:
  a diaphragm, and
  a connecting rod, wherein a spring is coupled to a first end of the connecting rod and the magnet is coupled to a second end of the connecting rod, and the connecting rod is coupled to the diaphragm at a location between the first end and the second end of the connecting rod;
a magnet coupled to the pressure resistive device;
a digital displacement sensor to sense a position of the magnet; and
at least one electronic indicator in communication with the digital displacement sensor, wherein the at least one electronic indicator being activated when the first pressure exceeds the second pressure by a predetermined amount, and the electronic indicator is in communication with a secondary power source.

22. A differential pressure indicator comprising:
a housing;
at least two ports in the housing, a first port to which a first pressure is ported, and a second port to which a second pressure is ported;
a piston assembly including:
  a piston, and
  a spring coupled to the piston at an end of the piston, opposite a second end of the piston where a magnet is coupled, wherein the piston is placed between the first port and the second port, and the piston changes a position when the first pressure exceeds the second pressure by a predetermined amount;
a solid state digital displacement sensor to sense a position of the magnet; and
at least one light-emitting diode (LED) in communication with the solid state digital displacement sensor, wherein the at least one light-emitting diode (LED) is activated when the first pressure exceeds the second pressure by a predetermined amount.

23. The differential pressure indicator according to claim 22, wherein the housing is made of metal.

24. The differential pressure indicator according to claim 22, wherein the housing is made of plastic.

25. A differential pressure indicator, comprising:
a housing;
at least two ports in the housing, a first port to which a first pressure is ported, and a second port to which a second pressure is ported;
a diaphragm assembly including:

a diaphragm, and a connecting rod, wherein a spring is coupled to an end of the connecting rod and a magnet is coupled to a second end of the connecting rod, and the diaphragm is coupled to the connecting rod at a location between the end and the second end, the diaphragm is located between the first port and the second port, and the diaphragm changes a position when the first pressure exceeds the second pressure by a predetermined amount;

a digital displacement sensor to sense a position of the magnet; and at least one light-emitting diode in communication with the digital displacement sensor, wherein the at least one light-emitting diode is activated when the first pressure exceeds the second pressure by a predetermined amount.

26. The differential pressure indicator according to claim 25, wherein the housing is made of metal.

27. The differential pressure indicator according to claim 25, wherein the housing is made of plastic.

28. A differential pressure indicator, comprising:

a housing;

at least two ports in the housing, a first port to which a first pressure is ported, and a second port to which a second pressure is ported;

a pressure resistive device located between the first port and the second port, wherein the pressure resistive device changes a position when the first pressure exceeds the second pressure by a predetermined amount;

a magnet coupled to the pressure resistive device;

a solid state digital displacement sensor to sense a position of the magnet;

a control module electrically coupled to the digital displacement sensor; and at least one electronic indicator in communication with the control module, the at least one electronic indicator being activated when the first pressure exceeds the second pressure by a predetermined amount.

29. The device of claim 28 wherein the control module is an electronic circuit.

30. The device of claim 28 wherein the control module is a microcontroller.

31. The device of claim 30 further including a plurality of electronic indicators sequentially activating according to a schema based on temporal measurements of signals from the solid state digital displacement sensor.

32. A differential pressure indicator, comprising:

a housing;

at least two ports in the housing, a first port to which a first pressure is ported, and a second port to which a second pressure is ported;

a pressure resistive device located between the first port and the second port, wherein the pressure resistive device changes a position when the first pressure exceeds the second pressure by a predetermined amount;

a magnet coupled to the pressure resistive device;

a solid state digital displacement sensor to sense a position of the magnet;

at least one electronic indicator in communication with the solid state digital displacement sensor, the at least one electronic indicator being activated when the first pressure exceeds the second pressure by a predetermined amount; and a voltage regulator receiving power from a primary power supply, the voltage regulator being adapted to receive a voltage input within a range between about 3.8 VDC and about 30 VDC and a current as low as about 10 mA.

* * * * *